United States Patent [19]

Hostetler

[11] Patent Number: 5,193,485

[45] Date of Patent: Mar. 16, 1993

[54] TWO-STAGE METERING PIN

[75] Inventor: Eldon Hostetler, Middlebury, Ind.

[73] Assignee: Ziggity Systems, Inc., Middlebury, Ind.

[21] Appl. No.: 580,443

[22] Filed: Sep. 10, 1990

[51] Int. Cl.$^5$ .................. A01K 7/06; A01K 39/00; F16K 31/00

[52] U.S. Cl. .................. 119/72.5; 251/121; 251/339

[58] Field of Search .................. 119/72.5, 72, 75; 251/120, 121, 118, 339

[56] References Cited

U.S. PATENT DOCUMENTS

| | | | |
|---|---|---|---|
| 1,454,284 | 5/1923 | Holmes | 119/72.5 |
| 2,541,369 | 2/1951 | Kofford | |
| 2,770,443 | 11/1956 | Rand | 251/218 |
| 2,851,007 | 9/1958 | Kagan | 119/72.5 |
| 3,416,499 | 12/1968 | Wilmot | 119/72.5 |
| 3,602,197 | 8/1971 | Fioretto | |
| 3,648,663 | 3/1972 | Kofford | 119/75 |
| 3,716,030 | 2/1973 | Godshalk et al. | |
| 3,750,628 | 8/1973 | Schumacher | 119/72.5 |
| 3,756,199 | 9/1973 | Clark | 119/72.5 |
| 3,862,621 | 1/1975 | Peppler | 119/75 |
| 3,887,165 | 6/1975 | Thompson | 251/339 |
| 4,282,831 | 8/1981 | Nilsen | |
| 4,284,036 | 8/1981 | Hostetler | |
| 4,402,343 | 9/1983 | Thompson | 137/614.2 |
| 4,524,724 | 6/1985 | Steudler, Jr. | |
| 4,587,373 | 5/1986 | Hostetler et al. | 119/72.5 |
| 4,606,301 | 8/1986 | Steudler, Jr. | |
| 4,610,221 | 9/1986 | Steudler, Jr. | |
| 4,637,345 | 1/1987 | Hostetler | |
| 4,984,537 | 1/1991 | Steudler, Jr. | 119/72.5 |

FOREIGN PATENT DOCUMENTS

| | | |
|---|---|---|
| 0332852 | 11/1989 | European Pat. Off. |
| 1216006 | 5/1966 | Fed. Rep. of Germany ........ 119/75 |
| 3506258 | 8/1986 | Fed. Rep. of Germany ........ 119/75 |
| 8901747.1 | 11/1989 | Fed. Rep. of Germany . |
| 2005311 | 4/1969 | France .................. 119/72.5 |
| WO84/04655 | 12/1984 | PCT Int'l Appl. |
| WO89/11218 | 11/1989 | PCT Int'l Appl. |
| 1152819 | 5/1969 | United Kingdom . |
| 1248622 | 10/1971 | United Kingdom . |
| 1321644 | 6/1973 | United Kingdom . |
| 1420342 | 1/1976 | United Kingdom . |
| 2134765 | 8/1984 | United Kingdom . |
| 2200726 | 8/1988 | United Kingdom . |
| 2200726A | 8/1988 | United Kingdom . |
| 2220050 | 12/1989 | United Kingdom . |

OTHER PUBLICATIONS

Aquasip Mark 3 brochure—Eastwoods.
Fox Nipple Valve brochure—Fox Products Company.
Series 300E E-Z Sip Cage Watering System brochure—Ziggity Systems, Inc.
European Search Report.

Primary Examiner—John G. Weiss
Attorney, Agent, or Firm—Barnes & Thornburg

[57] ABSTRACT

A metering pin is provided having two portions of different external configuration, each of which portions are insertable into the fluid flow path for restricting fluid flow under different actuating conditions. These two portions can be dimensioned to be readily retrofit into various existing nipple drinkers according to the configuration of the drinker inlet. The specific dimensions of each portion relative to the drinker inlet can be selected according to desired flow rates at different levels of poultry growth.

18 Claims, 2 Drawing Sheets

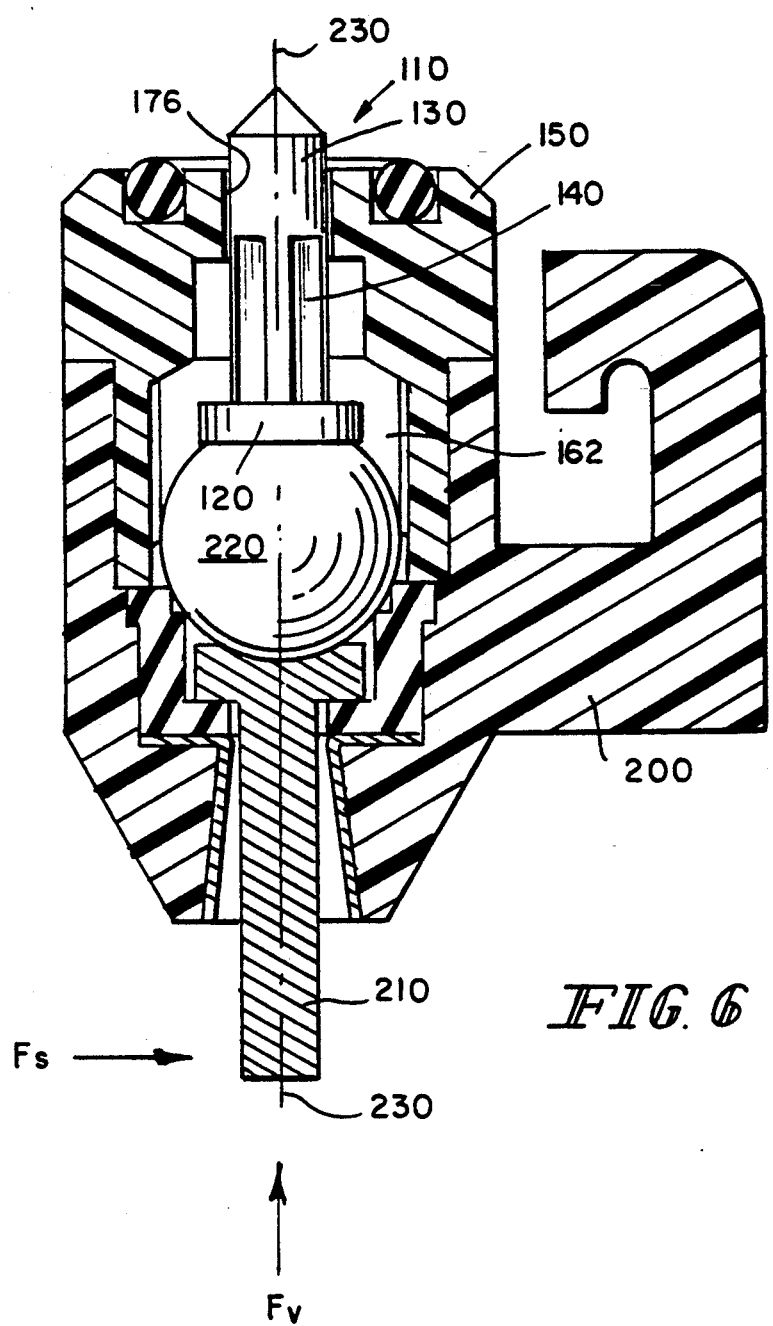

TWO-STAGE METERING PIN

BACKGROUND OF THE INVENTION

The present invention relates generally to poultry and small animals watering devices and, more particularly, to nipple drinker systems for poultry.

The invention of this application represents an improvement upon the invention described in co-pending U.S. Pat. application Ser. No. 07/420,683, filed Oct. 11, 1989. That prior invention relates generally to an improved arrangement for trigger drinkers wherein a metering pin is employed to regulate the flow of fluid upstream from the ball valve arrangement in the typical nipple drinker. The present invention provides refinement and improvement in specific structure of metering pins for such drinkers.

Prior nipple drinkers (also commonly referred to as trigger drinkers) such as the model 300 nipple drinker marketed by Ziggity Systems, Inc. several years ago demonstrated that nipple drinkers can be used successfully to improve the growing conditions of poultry by varying the water flow rates to birds as they mature. Specifically, the Ziggity Model 300 drinker provided two types of water flow to the poultry depending upon the method of actuation. Side to side force applied to the actuating pin, such as is typically used by day-old chicks and young birds, produced a relatively low flow rate sufficient to meet the demands of birds of that age. It is believed that this lower flow rate was achieved because in side to side motion the actuating (or "trigger") pin, which was in that model the flow restricting pin, was partially blocking the flow through the drinker outlet in combination with the ball valve element. On the other hand, as the birds matured and needed more water they demonstrated a tendency to lift the pin more often with vertical force. It was found the vertical actuation of the trigger pin provided a greater rate of flow, presumably because there was less obstruction in the flow passageway through the drinker outlet. Another factor in the difference in flow rates was that the water pressure was gradually increased as the birds matured, typically from 3 inches to less than 12 inches of water pressure.

As indicated in the above-referenced patent application, however, experience has shown that in some circumstances the Ziggity Model 300 nipple drinker did not maintain its optimum performance forever. Particularly, over a period of several years there was a possibility that the opening at the outlet of the nipple drinker would become enlarged as a result of wear. Further, in those instances where the water supply is not properly filtered or where sediments and contaminates result in the water supply system (possibly because of excessive or combinate use of water additives by growers) valve operation could be detrimentally affected. Further, in nipple drinkers produced by other sources employing metal seats and metal trigger pins it has been reported that an additional factor contributing to wear at the nipple drinker outlet is the effect of electrolysis between the metal surfaces. Typically, as the drinker outlet increased in size the incidents of leakage and excessive water flow also increased.

In response to the gradual enlargement of the nipple drinker outlet, it has been suggested to decrease the water pressure to prevent excessive leakage and excessive flow of water to the poultry. However, this solution has been found useful only for a limited period of time and even if continued the water pressure would need frequent adjustment throughout the useful life of the nipple drinker. The typical grower would, thus, need to be constantly alert to the condition of his equipment so as to maintain optimum conditions. It is more desirable however, to create a system that is maintenance free throughout its useful life without decreasing the length of that useful life. Thus, the thrust of the above-referenced patent application was to shift the flow control location to the inlet of the nipple drinker through the use of a metering pin which moved vertically in response to either type of actuating force.

While the metering pin of the above-described patent application has performed satisfactorily in many instances, it has been discovered that performance can be improved even further through the use of the present invention. With a single stage metering pin only a single type of flow rate is typically observed because the net affect of any type of movement of the trigger pin is to provide vertical movement of the metering pin. Thus, the total volume of water supplied is proportional to the water pressure in the same manner at all stages of poultry growth. In certain instances, however, it is desirable still to provide a lesser volume of water for day-old chicks than this proportional relationship would permit without adversely affecting the water supply to those birds as they get older. Prior metering pins have used greater water pressures, for example, to increase the flow rate to supply birds with adequate water during hot weather. However, such increased pressures also increase the potential for leakage and require greater force to open the nipple drinker valve. Where leveraged actuation of the trigger pin against the ball of the nipple drinker valve is employed, as described in U.S. Pat. No. 4,491,088, this can often still be readily achieved even by day-old chicks. However, it has been found to be advantageous to decrease the actuation force necessary for day-old chicks to obtain water as much as possible. It has also been suggested that manufacturing costs of nipple drinkers can be decreased by employing flat-headed trigger pins, without the recess used for leverage actuation. Further, it has also been suggested that various different plastic and rubber seat compositions can be employed to provide greater sealing and improved resistance to chemical deterioration, especially in watering systems needing frequent flushing at relatively high pressures. Both of these types of arrangements are believed to be able to result in a higher necessary actuation force in some circumstances than certain day-old chicks, particularly those from spent hens, are able to provide. Thus, it is desirable to provide a metering pin arrangement which does not require increased pressure to achieve greater flow rate for day-old chicks. On the other hand, it is desirable to provide for greater water volume to be available to older birds using the same watering system.

It is an object of the present invention to provide an improved nipple drinker.

Another object of this invention is the provision of an improved nipple drinker which includes a metering pin which optimizes flow rates at reduced pressures.

These and other advantages of the present invention are achieved by the provision of a metering pin having two portions of different external configuration, each of which portions are insertable into the fluid flow path for restricting fluid flow under different actuating conditions. These two portions can be dimensioned to be readily retrofit into various existing nipple drinkers according to the configuration of the drinker inlet. The specific dimensions of each portion relative to the drinker inlet can be selected according to desired flow rates at different levels of poultry growth.

Other objects, advantages and novel features of the present invention will become apparent from the following detailed description of the invention when considered in conjunction with the accompanying drawings.

BRIEF DESCRIPTION OF THE DRAWINGS

FIG. 6 shows a cross sectional view of a generic nipple drinker incorporating an alternative embodiment of the present invention.

DESCRIPTION OF PREFERRED EMBODIMENTS

Figures 1, 2, 3:
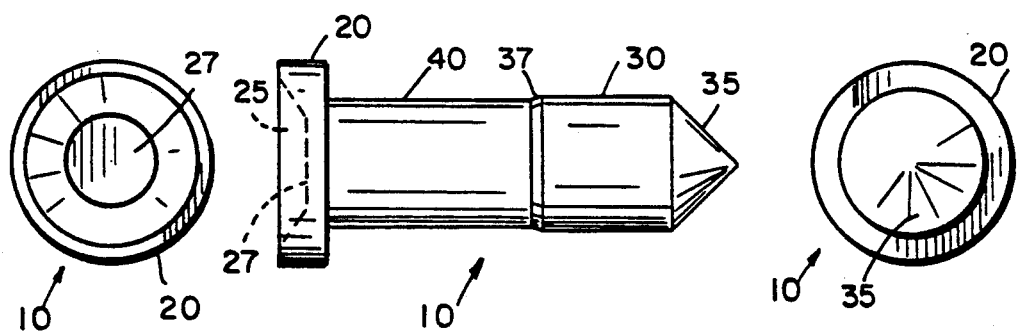
FIG. 1 shows a side view of a metering pin incorporating the present invention.
FIG. 2 shows an end view of the embodiment of FIG. 1 looking from taper 35 toward head portion 20.
FIG. 3 shows an end view of the embodiment of FIG. 1 looking from head portion 20 toward taper 35.

FIG. 1, which illustrates a preferred embodiment of the present invention, shows an improved metering pin 10 having a head portion 20, a first stage portion 30 and a second stage portion 40. Metering pin 10 is preferably formed from Celcon M9004 material.

Head portion 20 includes a central recess 25 having end face 27. Recess 25 is preferably not formed to correspond exactly with the shape of the particular ball valve element employed by the nipple drinker into which metering pin 10 is inserted. Instead, recess 25 preferably has a truncated conical shape which can receive a portion of the ball. The diameter of recess 25 is preferably wider than that portion of the ball contained within the recess when the ball contacts end face 27. When used with a Ziggity Model 1025 drinker, end face 27 preferably has a diameter of approximately 0.085 ±0.005 inch and the largest diameter of recess 25 is preferably approximately 0.194±0.005 inch. Such a configuration has been found to reduce adhesion between metering pin 10 and the ball so that the ball can rotate freely within the valve chamber of the drinker.

First stage portion 30 includes a conical taper 35 opposite head portion 20. In preferred embodiments first stage portion 30 and second stage portion 40 are both substantially cylindrical, although of different dimensions. Between first stage portion 30 and second stage portion 40 is disposed an inclined transition surface 37. The diameter of first stage portion 30 is preferably larger than the diameter second stage portion 40, and the length of first stage portion 30 is preferably less than the length of second stage portion 40. When employed in a Ziggity Model 1025 drinker first stage portion 30 is preferably dimensioned to have approximately 0.004 inch total gap with respect to the gap opening, the interior diameter of the cap opening being 0.004 inch (approximately) larger than the exterior diameter of portion 30. At the same time, second stage portion 40 would have approximately 0.008 inch total gap with respect to the cap opening, the internal diameter of the cap opening being approximately 0.008 inch larger than the exterior diameter of portion 40.

In this preferred arrangement the respective component dimensions would be, for example:

internal diameter of cap opening = 0.1407±0.002 inch external diameter of portion 30 = 0.1368±0.0002 inch external diameter of portion 40 = 0.1325±0.0002 inch external diameter of portion 20 = 0.215±0.005 inch The precise dimensions of these portion 30 and 40 relative to the cap opening will determine the exact rate of water flow available into the drinker at a given water pressure since the outlet opening from the drinker will preferably be relatively enlarged so as not to restrict the flow once the valve is opened. Manufacturing tolerances are determined by the degree of precision desired in watering rates, although the tolerances noted above have been found advantageous and obtainable in practice with the preferred material.

Figures 4, 5:
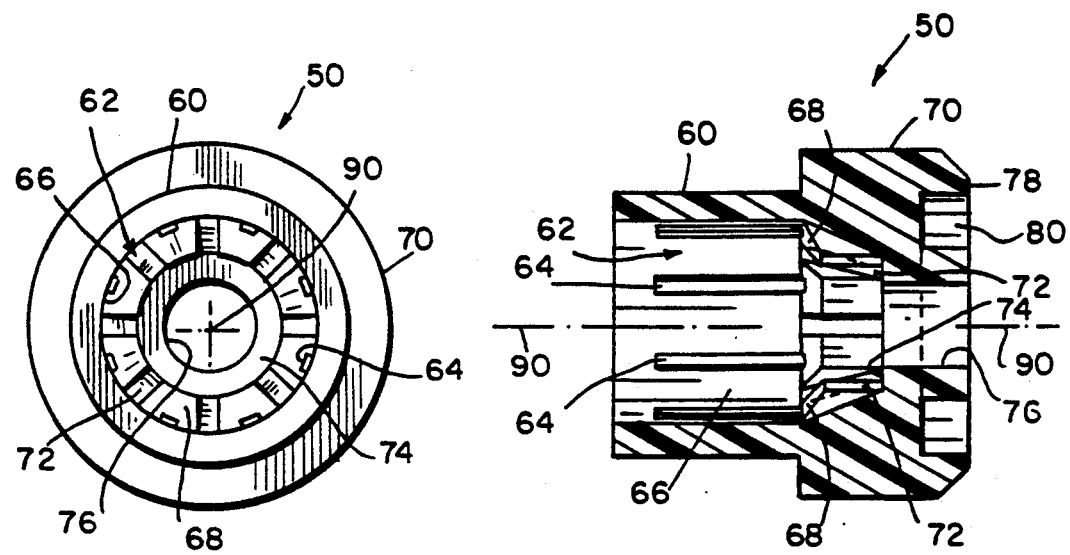
FIG. 4 shows a cross sectional view of a cap portion of a nipple drinker as modified to incorporate the present invention.
FIG. 5 shows an end view of the structure of FIG. 4 looking from chamber 62 toward cap opening 76.

It should also be noted that other relative dimensions of components are of some significance. When metering pin 10 is used with the Ziggity Model 1025 drinker it is also preferable to modify the drinker cap as shown in FIGS. 4 and 5. Revised cap 50 includes a lower portion 60 for insertion into the standard base of the Ziggity Model 1025 drinker housing to form the upper section of the valve chamber. Revised cap 50 further includes upper portion 70 which forms an exterior portion of the drinker housing and is receivable within a standard saddle for the Ziggity Model 1025 drinker. Lower portion 60 includes a chamber 62 for receiving a standard ball valve element. Multiple guiding projections 64 are located on interior surface 66 of chamber 62 to facilitate ball movement during valve operation.

Where lower portion 60 joins upper portion 70 there are inclined surfaces 68 in chamber 62 which serve as upper stops to motion of the ball valve element. Slots 72 are provided in surfaces 68 to permit fluid flow into chamber 62 even when the ball valve element is held in its uppermost position. Slots 72 extend into upper portion 70 until reaching surface 74 which serves as the upper stop to motion of head portion 20 of metering pin 10. Cap opening 76 extends from surface 74 to the top surface 78 of upper portion 70 and is preferably a cylindrical opening of constant diameter. Top surface 78 includes a recess 80 for receiving a standard sealing O-ring.

During assembly, metering pin 10 is preferably inserted into chamber 62 with taper 35 penetrating cap opening 76. Head portion 20 is pushed into chamber 62 until it abuts surface 74. Cap 50 is then inserted within the standard base portion. The distance between surfaces 68 and 74 and the thickness of head portion 20 relative to the size of the ball valve element are preferably dimensioned such that head portion 20 is movable along longitudinal axis 90, even when the ball valve element abuts surface 68, to such an extent that it does not restrict flow of water into the drinker. Similarly, the exterior diameter of head portion 20 is preferably sufficiently smaller than the diameter of surface 74 so as not to restrict the flow of water. Thus, the closest dimensions (and resultant flow restriction) preferably occurs within cap opening 76.

In the preferred embodiment described above the length of cap opening is less than the length of first stage portion 30. Preferably the relative positions and lengths of metering pin 10, portions 30 and 40 and cap opening 76 are such that portion 30 is within cap opening 76 when the drinker is triggered by side to side actuating force and that only portion 40 is within cap opening 76 when the drinker is triggered by vertical actuating force. For example, respectively component dimensions could be:

metering pin length=0.490±0.005 inch head portion length=0.054±0.005 inch portion 40 length=0.210±0.005 inch cap opening length=0.132±0.005 inch distance of surface 74 from junction of lower portion 60 and upper portion 70=0.132±0.005 inch Thus, in preferred embodiments the flow rate through the drinker during side to side triggering is determined by the relative dimensions of portion 30 and cap opening 76 while during vertical triggering the flow rate through the drinker is determined by the relative dimensions of portion 40 and cap opening 76. It will now be evident that cylindrical configurations are not the only permissible designs for metering pin 10. While cylindrical formations of portions 30 and 40 are often commercially practical, other configurations will offer similar advantages. One such embodiment is shown, for example, in the generic drinker of FIG. 6. A common requirement is, however, that greater fluid flow be permitted through cap opening 76 when the drinker is triggered vertically than when the drinker is triggered side-to-side. Typically, this can be accomplished by increasing the gap between portion 40 and cap opening 76 as compared with the gap between portion 30 and cap opening 76.

In FIG. 6, for example, metering pin 110 is provided with circumferential slots 140 between cylindrical portion 130 and head portion 120. Metering pin 110 is disposed in valve chamber 162 between cap 150 and standard base 200 along with standard actuating pin 210 and standard ball valve element 220. When actuating pin 210 lifts ball valve element 220 upward along axis 230 in response to side-to-side force Fs, metering pin 110 also moves upward along axis 230, but slots 140 do not extend above cap opening 176. However, when actuating pin 210 lifts ball valve element 220 in response to vertical force Fv, metering pin 110 is normally moved higher along axis 230 such that slots 140 do not extend above cap opening 176 and a greater rate of water flow is permitted.

In contrast with metering pin 10, metering pin 110 has been formed with polyethylene material and with a hollow core to improve dimensional consistency. For most applications noted by the applicant thus far metering pin 10 is, however, preferred over metering 110.

Thus, by permitting two different flow rates the total volume of water available during actuating is no longer merely proportional to the water pressure. Since these two flow rates typically occur during different stages of poultry growth, water availability can be optimized according to poultry needs while maintaining minimal, if any, leakage. It has been found in some instances with the present invention that adequate water is available to day-old chicks with only 3 inches of water pressure and adequate water if available to poultry in the last 10 days of growth with only 8 inches of water. With such low water pressures good actuation sensitivity is also maintained and leakage is minimized.

Also, the preferred embodiments have been described above primarily with respect to the Ziggity Model 1025 drinker because that drinker has achieved widespread application. The present invention can, however, be readily applied to many other nipple drinker styles with minimal effort.

Although the present invention has been described above in detail, the same is by way of illustration and example only, and not to be taken as a limitation of invention. The spirit and scope of this invention are instead limited only by the scope and content of the following claims.

What is claimed is:

1. A metering pin in combination with a nipple drinker for poultry having an inlet, an outlet, a valve chamber between said inlet and said outlet, a ball valve element and an actuating pin disposed within said valve chamber, said actuating pin extending through said outlet and being responsive to force from at least two different directions to actuate said ball valve element, said metering pin being disposed within said inlet and said valve chamber so as to be movable by said ball valve element during acutation of said ball valve element, including a first portion and a second portion, each of said portions being dimensioned so as to be able to pass through said inlet and out of said nipple drinker, said first portion serving to permit the flow of fluid at a first rate for poultry consumption through said valve chamber in response to actuation of said ball valve element by force applied to said actuating pin from one direction, and said second portion serving to permit the flow of fluid at a second rate for poultry consumption through said valve chamber in response to actuating of said ball valve element by force applied to said actuating pin from another direction.

2. The invention according to claim 1, wherein said metering pin allows fluid to flow into said valve chamber at both said first and said second rates.

3. In a device for watering poultry and small animals, including a valve housing having an inlet, an outlet and a chamber between said inlet and said outlet, valve means within said chamber for controlling fluid flow to said outlet, actuating means extending through said outlet for actuating said valve means, and metering means extending through said inlet for controlling the amount of fluid flow to said chamber, the improvement comprising:

said metering means including means for producing different amounts of fluid flow to said chamber to permit different drinking rates in response to different actuated positions of said valve means.

4. The invention according to claim 3 wherein said metering means comprises a pin extending through said inlet with clearance between said inlet and the exterior surface of said pin and said pin includes a first portion having a first circumferential dimension and a second portion having a second circumferential dimension, said first circumferential dimension being different from said second circumferential dimension and both said first and said second portions each being receivable within said inlet, said inlet being that portion of said valve housing which first receives fluid.

5. The invention according to claim 4 wherein said metering pin includes a third portion disposed substantially within said chamber and having a circumferential dimension larger than the circumferential dimension of said inlet.

6. The invention according to claim 3 wherein said metering means comprises a pin having a cylindrical portion receivable within said inlet and an enlarged portion receivable within said chamber, said cylindrical portion having first and second sections, said first section having slots formed on the exterior surface of said pin for permitting a greater amount of fluid flow through said inlet as compared with the amount of fluid flow permitted through said inlet by said second section.

7. The invention according to claim 3 wherein said metering means includes a first portion receivable within said chamber and a second portion including first and second sections, the cross-sectional area of said first section being larger than the cross-sectional area of said second section and the cross-sectional area of said inlet being larger than the cross-sectional area of said first section such that when said first section is within said inlet a lesser drinking rate is provided that when said second section is within said inlet without said first section also being within said inlet.

8. The invention according to claim 7 wherein the cross-sectional area of said inlet is substantially constant along the entire length of said inlet, the cross-sectional area of said first section is substantially constant along the entire length of said first section, and said second section includes at least two different cross-sectional areas along the length of said second section.

9. A metering pin in combination with a nipple drinker for poultry having an inlet for first receiving fluid from a source of fluid, an outlet, a valve chamber between said inlet and said outlet, a valve element and an actuating pin disposed within said valve chamber, said actuating pin extending through said outlet, said metering pin:
including a first portion having a circumferential dimension and a second portion having a circumferential dimension, the circumferential dimension of each of said first portion and said second portion being less than the circumferential dimension of said inlet,
said circumferential dimension of said first portion being larger than the circumferential dimension of said second portion, and
said metering pin including a third portion having a circumferential dimension larger than the circumferential dimension of said inlet.

10. In a device for watering poultry and small animals, including a valve housing having an inlet, an outlet and a chamber between said inlet and said outlet, valve means within said chamber for controlling said fluid flow to said outlet, actuating means extending through said outlet for actuating said valve means, and metering means extending through said inlet for controlling the amount of fluid flow to said chamber, the improvement comprising:
said metering means including differential rate means for producing different amounts of fluid flow to said chamber to permit different drinking rates in response to different actuated positions of said valve means, and
said differential rate means comprising a pin extending through said inlet with clearance between said inlet and the exterior surface of said pin and said pin including a first portion having a first circumferential dimension and a second portion having a second circumferential dimension, said first circumferential dimension being different from said second circumferential dimension and both said first and said second portions receivable within said inlet, said first portion permitting a first drinking rate and said second portion permitting a second drinking rate, said second drinking rate being different from said first drinking rate.

11. A device for watering poultry and small animals comprising:
a nipple drinker housing having an inlet opening and an outlet opening,
said inlet opening forming that portion of said housing which first receives fluid from an outside source,
a valve chamber disposed within said housing between said inlet opening and said outlet opening,
a valve element and an actuating pin disposed within said valve chamber,
said actuating pin extending through said outlet opening,
a metering pin extending through said inlet opening and movable therein along a longitudinal length of said metering pin,
said metering pin having at least two different external configurations along said longitudinal length and being associated with said valve element such that during actuation of said valve element to permit fluid flow to said poultry or small animals at least two different rates of fluid flow through said inlet opening are obtainable depending upon the disposition of said longitudinal length within said inlet opening.

12. The watering device according to claim 11 wherein said metering pin includes a first external configuration having a first cross-sectional area and a second external configuration having a second cross-sectional area, said first cross-sectional area being smaller than said second cross-sectional area.

13. The watering device according to claim 11 wherein said actuating pin is responsive to actuating forces in a first direction to move said valve element a first distance within said valve chamber and is responsive to actuation forces in a second direction to move said valve element a second distance within said valve chamber and said metering pin is associated with said valve element such that movement of said valve element by said first distance causes at first rate of fluid flow through said inlet opening and movement of said valve element by said second distance causes a second rate of fluid flow through said inlet opening.

14. The watering device according to claim 11 wherein the space available for fluid flow between said actuating pin and said outlet opening is greater than the greatest space available for fluid flow between said metering pin and said inlet opening.

15. A metering pin in combination with a nipple drinker for watering poultry, that nipple drinker having an inlet, an outlet, a valve chamber between said inlet and said outlet, a valve element disposed within said valve chamber, and a actuating pin extending through said outlet, said metering pin comprising:

a longitudinally extending portion dimensioned with respect to said inlet so as to be slidable within said inlet with sufficient clearance so as to permit fluid flow between said metering pin and said inlet in sufficient quantity to adequately water poultry when said valve element is actuated, said longitudinally extending portion including at least first and second different circumferential dimensions at different locations along said longitudinally extending portion, and said first and second circumferential dimensions being selected so as to respectively permit first and second different rates of said fluid flow between said metering pin and said inlet to permit different normal rates of fluid consumption by poultry when said valve element is actuated, according to the nature of the actuating force being applied to said actuating pin.

16. A device for watering poultry and small animals comprising:

a drinker adapted to be connected to a source of fluid;

an oriface within said drinker which is dimensioned so as to determine the maximum amount of fluid permitted to flow through said drinker;

a longitudinally extending element which is movable along its longitudinal axis within said oriface in response to actuation forces applied to said drinker between a first position, corresponding to initial actuating of said drinker, and a second position, corresponding to full actuation of said drinker; and said longitudinally extending element having different configurations along its longitudinal axis such that said movement of said longitudinally extending element within said oriface permits a first rate of fluid flow through said drinker when said longitudinally extending element is at said first position and a second rate of fluid flow through said drinker when said longitudinally extending element is at said second position, said first rate being less than said second rate.

17. The device according to claim 16 wherein said different configurations include a first cross-sectional area at a given location within said oriface when said longitudinally extending element is at said first position and a second cross-sectional area at said given location within said oriface when said longitudinally extending element is at said second position, and wherein said first cross-sectional area is greater than said second cross-sectional area.

18. A device for watering poultry or small animals comprising a nipple drinker having:

an inlet for receiving fluid from a supply line;

an outlet for permitting fluid to flow to poultry or small animals;

a valve chamber located between said inlet and said outlet;

fluid passageways connecting said inlet and said outlet to said valve chambers;

a valve element located within said valve chamber for controlling the flow of fluid through said nipple drinker;

actuating means extending into said valve chamber for actuating said valve element;

a metering element disposed at least in part at a given location within at least one of said fluid passageways and being movable within said fluid passageway;

said metering element and said fluid passageway into which said metering element is disposed being formed and dimensioned with respect to each other such that the maximum amount of fluid flow through said nipple drinker at a given fluid pressure when said valve element is fully actuated is determined by the cross-sectional area between said metering pin and said fluid passageway at said given location;

said metering element including first and second portions alternatively disposable within said fluid passageway at said given location in response to the application of different actuating forces to said valve element;

said first and said second portions having different cross-sectional areas such that said different actuating forces result in different maximum amounts of fluid flow through said nipple drinker to permit different normal rates of fluid consumption.

* * * * *

UNITED STATES PATENT AND TRADEMARK OFFICE
CERTIFICATE OF CORRECTION

PATENT NO. : 5,193,485

DATED : March 16, 1993

INVENTOR(S) : Eldon Hostetler

It is certified that error appears in the above-identified patent and that said Letters Patent is hereby corrected as shown below:

Col. 3, line 63, delete "gap" and insert --cap--.
Col. 6, line 1, delete "if" and insert --is--.
Col. 6, line 41, delete "actuating" and insert --actuation--.
Col. 7, line 26, delete "that" and insert --than--.
Col. 8, line 47, delete "actuating" and insert --actuation--.
Col. 8, line 54, delete "at" and insert --a--.
Col. 9, line 29, delete "actuating" and insert --actuation--.

Signed and Sealed this

Twenty-third Day of November, 1993

Attest:

BRUCE LEHMAN

*Attesting Officer*  *Commissioner of Patents and Trademarks*